April 20, 1965     I. E. NUTTER     3,179,389
SELF-SEALING PRE-ASSEMBLED FLUID CONTACT TRAY UNIT
Filed Nov. 9, 1961     5 Sheets-Sheet 1
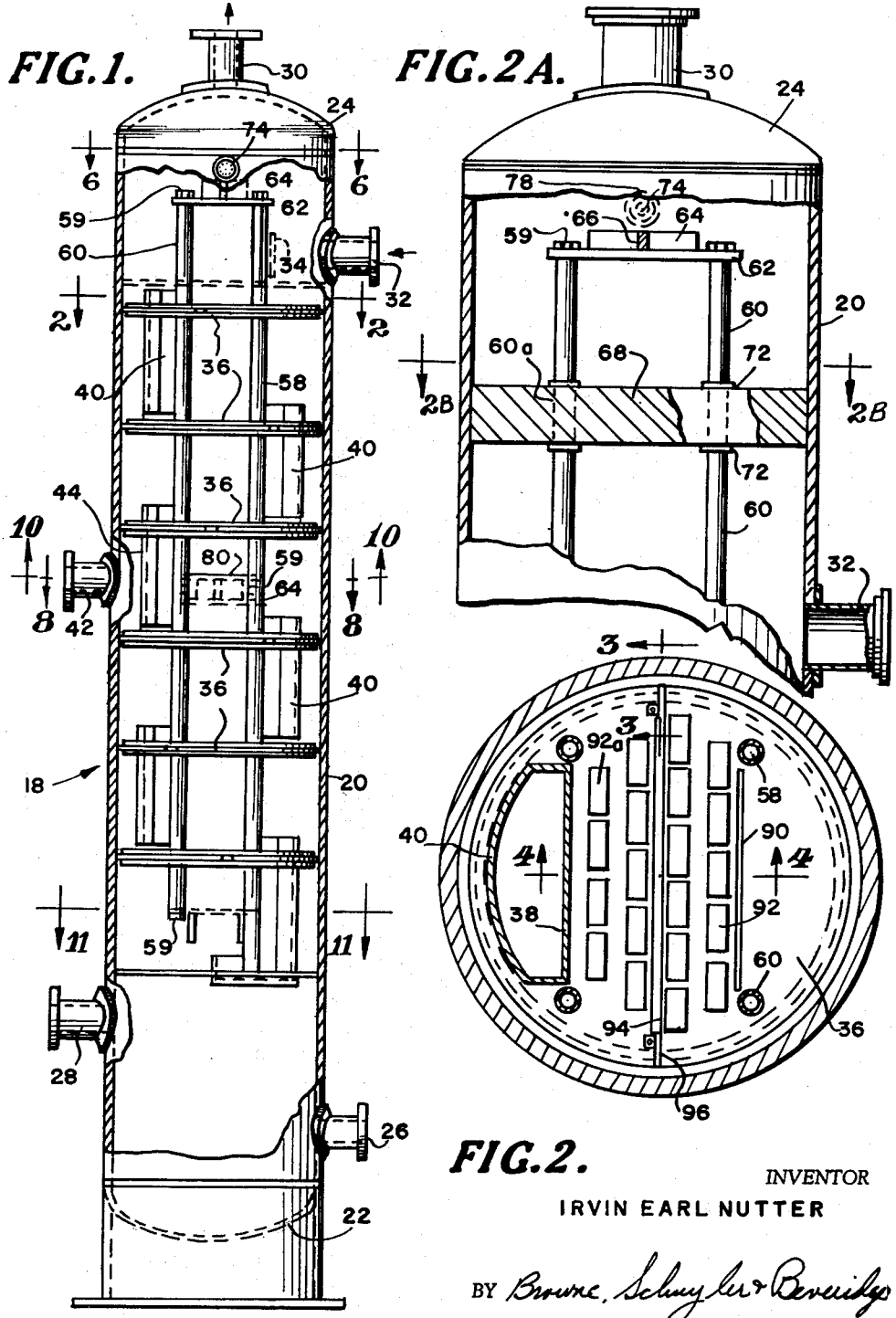
INVENTOR
IRVIN EARL NUTTER
BY Browne, Schuyler & Beveridge
ATTORNEYS

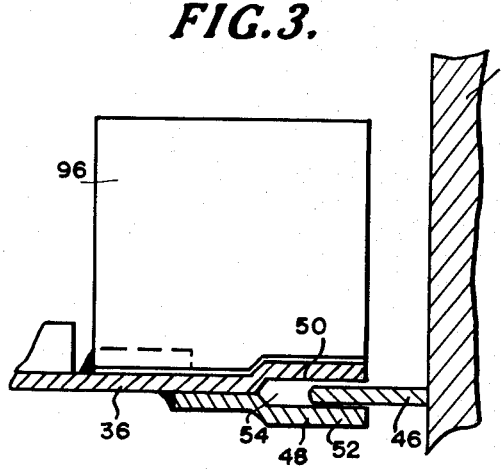
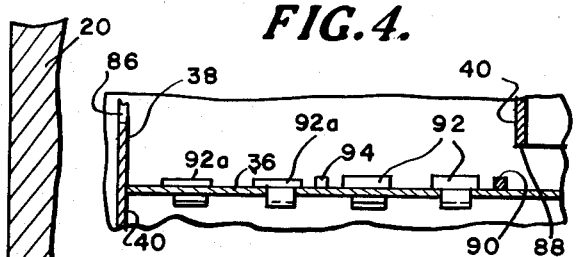
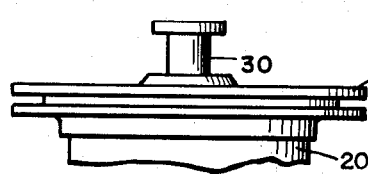
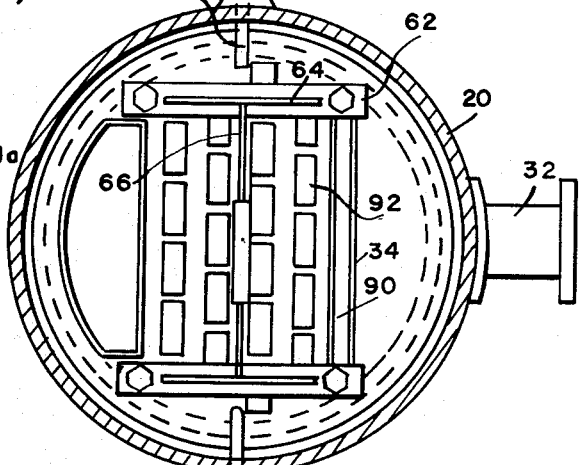
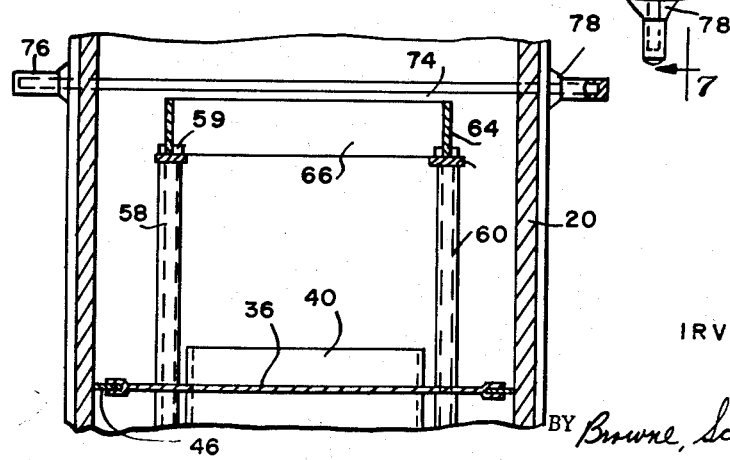

April 20, 1965 I. E. NUTTER 3,179,389
SELF-SEALING PRE-ASSEMBLED FLUID CONTACT TRAY UNIT
Filed Nov. 9, 1961 5 Sheets-Sheet 3

INVENTOR
IRVIN EARL NUTTER

BY *Browne, Schuyler & Beveridge*
ATTORNEYS

April 20, 1965  I. E. NUTTER  3,179,389
SELF-SEALING PRE-ASSEMBLED FLUID CONTACT TRAY UNIT
Filed Nov. 9, 1961  5 Sheets-Sheet 4

INVENTOR
IRVIN EARL NUTTER

BY
ATTORNEYS

United States Patent Office 3,179,389
Patented Apr. 20, 1965

3,179,389
SELF-SEALING PRE-ASSEMBLED FLUID
CONTACT TRAY UNIT
Irvin Earl Nutter, 2420 S. Owasso Place, Tulsa, Okla.
Filed Nov. 9, 1961, Ser. No. 151,333
1 Claim. (Cl. 261—114)

The present invention generally relates to gaseous and liquid contact apparatus, and more particularly to an assembled bubble tray unit for a bubble tower or the like having a plurality of fluid contact trays at vertically spaced levels and used for purposes of fractionation, absorption, distillation, and similar processes employed in the fields of petroleum refining, natural gas and gasoline processing, and chemical manufacture.

This application is a continuation-in-part of my earlier filed co-pending application Serial No. 37,645 of June 21, 1960 and now abandoned.

Gas and liquid contact apparatus of this class, with vertically spaced trays in horizontal position, provide transient pools or beds of liquid at these spaced intervals through which gaseous substance emits, so as to form intimacy of contact of the gaseous substance with the beds of liquid. Each contact tray includes a downspout to permit passage of the liquid downwardly from one tray to the succeeding lower tray and each downspout is provided with a suitable dam, referred to as a weir, to maintain the desired depth of liquid on each tray. In the present invention each tray is provided with a plurality of apertures to permit the upward passage of a gas or vapor through the tray to effect the desired contact for accomplishing the purposes heretofore enumerated. The form of the invention to be described is provided with elongated apertures having floating valves mounted therein to open or close the apertures upon increased gas or vapor rates of passage, for example as described in my Patent No. 2,951,691, issued September 6, 1960. This invention, however, is not limited to such means for vapor passage and could just as well accommodate the use of other means for vapor passage, such as bubble caps, perforations, or any other device known to the industries heretofore mentioned.

One of the problems encountered in the known and commonly used bubble towers, especially in towers of smaller diameter, is the insertion and subsequent removal of the trays in a confined space where it is difficult to manually handle or mount such contact equipment. One of the features of the present invention eliminates this problem as several contact trays are connected together prior to installation in the tower so that the trays, as a unit, may be readily inserted or removed from the tower. In such an arrangement there need be only one engaging and supporting portion of the tower to support the entire group of trays, rather than separate supports for each tray. Since the trays are all connected together as a unit, or in groups of units, the system may be engaged and supported at one point below the lowermost tray of the complete system. Additionally, each tray of all trays of a system is provided with a resilient sealing ring about its periphery to engage the wall of the tower.

An additional feature of this invention is the novel arrangement in the structural configuration of the individual trays themselves. This invention affords means for providing trays of essentially standard arrangement, but in addition embodies the features of mounting and sealing the trays in position, particularly in close confinement, without need of access to the very limited tower space. This arrangement allows the liquid to enter onto one side of one tray, traverse the tray laterally to the exit weir, thence down to the next tray on the opposite side and again laterally across the next tray below, in the opposite direction, until finally the bottom tray of the system emits the liquid from its downspout through a vapor seal to the receiving compartment in the base of the tower. It has been found that preassembled tray groups provide much greater convenience than assembly and mounting procedures used heretofore, and is especially feasible for use in small towers.

It is an object, therefore, of this invention to provide an improved bubble tower arrangement in which a plurality of contact trays may be inserted and removed as a unit.

It is another object of this invention to provide an improved sealing means between the periphery of each tray level and the wall of the enclosure, or vessel.

It is a further object of this invention to provide a simple and convenient means within the tower for supporting groups of trays therein.

It is still a futher object of this invention to provide means for arranging several groups of trays as units, so that said groups may be consecutively inserted in the vessel with each preceding group serving as a means of support for the succeeding groups.

Yet, a further object of the invention is the provision, for connection to the top of each tray assembly, of a lifting means for either lowering the groups of trays into position or to subsequently remove the trays from the system for inspection or cleaning, all of this to be accomplished without need for access except for hoist lines, which may be lowered into the vessel without need of servicemen entering into the vessel.

These and further objects and advantages will become readily apparent to those skilled in the art upon reading the following detailed description, when taken in conjunction with the appended drawings, wherein:

FIGURE 1 is a side elevation view of a bubble tower for liquid and gas contact with bubble tray area taken along the vertical center line and having two groups of trays arranged in accordance with the present invention;

FIGURE 1A is a side elevation view of an alternate upper closure member for the top of the tower of FIGURE 1;

FIGURE 2 is a horizontal cross section view of the full upper tray of the system taken along lines 2—2 of FIGURE 1;

FIGURE 2A is an alternate form of the upper portion of the tower shown in FIGURE 1, partially cut away and in section showing a mist pad positioned above the uppermost tray thereof;

FIGURE 3 is a cross section view taken along lines 3—3 of FIGURE 2;

FIGURE 4 is a cross section view taken along lines 4—4 of FIGURE 2;

FIGURE 6 is a cross section view take along lines 6—6 of FIGURE 1 above the top header with a partial plan view of the upper tray;

FIGURE 7 is a vertical cross section view taken along lines 7—7 of FIGURE 6;

Figure 8:
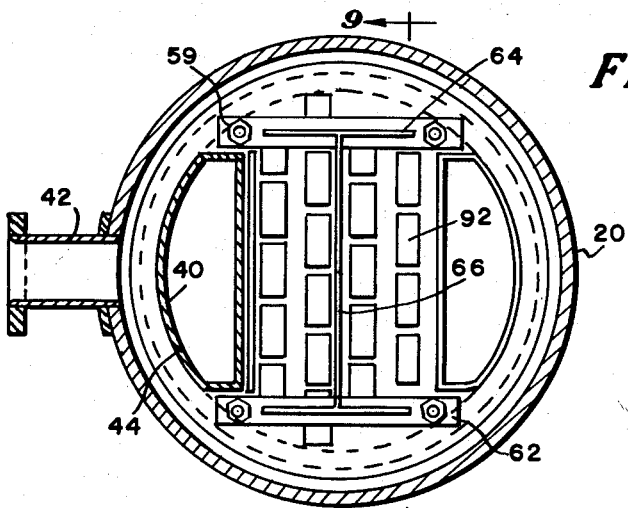
FIGURE 8 is a horizontal cross section view taken above the top header of a lower tray group of the system with a partial view of the top tray of the group, taken along lines 8—8 of FIGURE 1.

Referring now to the drawings, there is shown at 18 an exemplary embodiment of the bubble tower of the present invention. The tower 18 comprises a vertically extending tubular casing or shell member 20 (FIGURE 1) having a uniform transverse cross sectional configuration, preferably circular, and has its lower end closed by a lower closure member 22 integrally welded to the casing. A fluid-tight upper closure member 24 is mounted by welding on the upper end of the casing 20 or alternatively may be an upper flange closure 24a (FIGURE 1A) detachably secured thereto as by conventional flange bolts or the like (not shown).

Figure 2B:
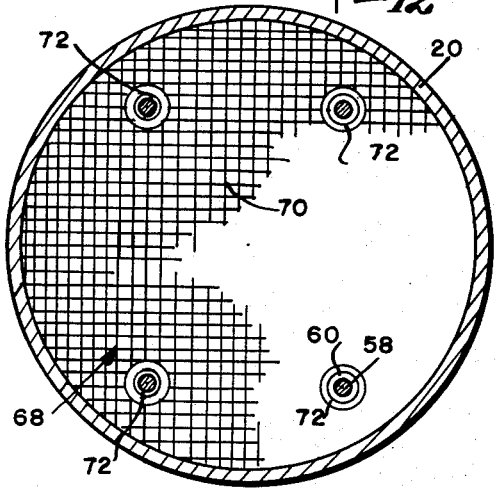
FIGURE 2B is a cross section view of the full mist pad, take along lines 2B—2B of FIGURE 2A.

A tubular gas or vapor inlet 28 is secured to the outer wall of casing 20 to permit the introduction of gas or vapor into the interior of the casing adjacent its lower end, and a tubular gas or vapor outlet 30 is secured to the top of upper closure member 24 so that gas or vapor, which is introduced into the lower end of the casing 20 through the vapor inlet 28, will ascend within the interior of the casing and will be discharged through the vapor outlet 30 at the upper end of the casing. A liquid inlet 32 is located adjacent the upper end of the casing and below the upper closure member 24 containing vapor outlet 30, as shown in FIGURE 1. Liquid entering through liquid inlet 32 into the casing 20 impinges against baffle 34 (FIGURE 1 and FIGURE 6), which serves to evenly disperse the entering liquid from its lower edge horizontally across tray deck 36. When the depth of the liquid exceeds the height of wall 38 of downcomer 40 (FIGURE 2), it flows over the wall, down the downcomer, and onto the next lower tray deck.

One or more secondary liquid inlets 42 (FIGURE 1, FIGURE 8, and FIGURE 10) may be positioned intermediate the top and bottom trays of the system to supplement liquid inlet for certain types of operation. Secondary liquid inlets 42 (only one is shown in FIGURE 1) are positioned on the wall of casing 20 directly adjacent the wall 44 (FIGURE 1, FIGURE 8, and FIGURE 10) of an intermediate downcomer 40, so that the entering liquid impinges against and flows down the back wall of wall 44 thereof. The downcomer thus serves to blend the entering liquid with the liquid flowing through downcomer 40 from tray deck 36 above. The combined liquids thence flow evenly from the bottom edge of the downcomer 40 onto the tray deck 36 beneath it.

Figure 5:
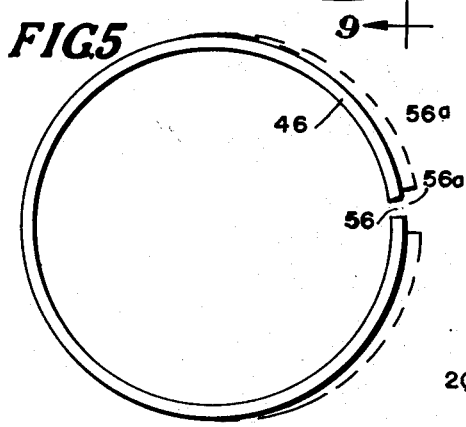
FIGURE 5 is a plan view of a resilient seal ring which forms part of this invention.
Figure 9:
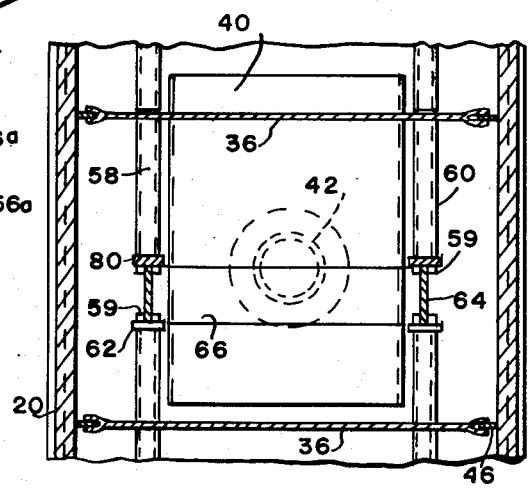
FIGURE 9 is a vertical cross section view taken along lines 9—9 of FIGURE 8.

Each tray deck 36 has provided around its periphery a resilient seal ring 46 (FIGURES 3 and 5) retained in position thereabout by retaining member 48 (FIGURE 3). Each outer periphery of tray decks 36 is formed to have an upwardly offset raised flange member 50 and each of the retaining members 48 is formed with a downwardly offset flange 52 about its circumference. Members 48 and 50, therefore, define a groove 54 about the periphery of tray deck 36 to receive seal ring 46 in a free floating fashion which may be compressed inwardly or outwardly within the groove so as to fully engage the inner wall of the casing 20 about its circumference. At the same time, the seal rings 46 remain in close tolerance fit within ring groove 54, irrespective of the variance between the dimension of the tray periphery or the inner wall of the casing. By this means a close tolerance seal is accomplished at all times between the tray and the wall of the casing to assure that the liquid will take its regular course, as heretofore described, horizontally across the tray, and will not spill about the periphery of the tray. Each seal ring 46 is of such length as to provide a small gap 56 (FIGURE 5), when in compressed position to assure freedom of movement as the tray groups are placed into or removed from casing 20. This gap 56 also serves as a controlled magnitude weephole for liquid to drain through the tower upon termination of operation, in preparation for servicing. Being made of resilient material seal ring 46 relaxes when not in position which results in a larger gap, as at 56a, to prevail between the ends of the ring. In this relaxed condition, the inside diameter of the seal ring 46 is still less than the outside diameter of the tray deck 36.

Further manual expansion of seal ring 46 beyond its normal relaxed position of larger gap 56a allows the seal ring to be slipped around the periphery of the tray deck 36 and inserted within groove 54 where it rests securely in relaxed position before installation in tower 18. Upon installation into tower 18, the seal ring is caused to contract to the position of gap 56 with the outer periphery thereof engaging the inside surface of the casing 20.

The tray decks of any system may be combined in a single group, or in several groups, as desired. In the system of FIGURE 1, two groups of tray decks are represented with the uppermost group terminating substantially along lines 10—10 (FIGURE 1). Each group of trays is secured together as an integral unit by rods 58, outlined by dotted lines (FIGURES 1, 7, 9, and 12), terminating at each group of trays with threaded ends having nuts 59 applied thereto. Each tray deck 36 contains suitable holes at the points of intersection of the rods 58 therewith for receiving the rods passing therethrough, and spacer tubes 60, of greater diameter than the holes in the tray decks, receive the rods thereby serving as spacers between the tray decks.

The rods 58 and spacer tubes 60 extend above the uppermost tray deck of each group to receive header assembly 62 (FIGURES 6 and 8) to the top face of which are welded extension pieces 64 in a vertical position. Connector plate 66 is disposed in a generally vertical position and is secured as by welding to the midpoint of each of the extension pieces 64.

An alternate arrangement which involves mounting a mist pad 68 (FIGURE 2A and FIGURE 2B) above the uppermost tray deck of the system is applied for certain types of operating requirements where the entrainment of liquid droplets or small bubbles of the liquid would otherwise be carried from the system by the vapor stream leaving through vapor outlet 30 and where such entrainment of liquid would be damaging to the quality of the vapor stream or in some operations represent a waste and loss of valuable liquids from the system. The bottom face of mist pad 68 is preferably positioned above top tray deck 36 a minimum distance equivalent to the spacing between the tray decks 36 of the system. The header assembly 62 with extension pieces 64 and connector plate 66 is spaced above the top face of mist pad 68 the same distance as above top tray deck 36 in installations where the mist pad 68 is not applied.

The mist pad 68 is comprised of a relatively fine woven wire mesh element 70 having a depth of but not limited to approximately one-fourth the normal spacing between tray decks 36 of the system and is pierced with aligned holes to receive stub spacer sleeves 60a of slightly less length than the thickness of mist pad 68, through which rods 58 extend for securement of pad in lateral and vertical position in respect to the complete assembly. Securement washers 72 about rods 58 are applied between the ends of the stub spacer sleeves 60a and adjacent ends of spacer sleeves 60 above and below mist pad 68 so as to positively secure the level and spaced position of the pad.

Because of stub spacer sleeves 60a being of slightly less length than the thickness of the mist pad 68, securement washers 72 embed slightly in the mist pad to more positively secure its location.

Extension pieces 64 and connector plate 66 are spaced a sufficient distance above top tray deck 36 or, if a mist pad 68 is used, above mist pad 68 to provide room for a hook or hoist line to be lowered into the casing 20, for lifting the entire tray assembly therefrom or for initially lowering the tray group into position during erection. The entire tray deck assembly within the casing 20 is retained in proximity of rest position by securement rod 74 (FIGURES 1, 2A, 6, and 7) positioned transversely across the inside of the casing 20 immediately above the extension pieces 64 and connector plates 66. Securement rod 74 is retained in position by caps 76 threaded into receiving hubs 78 welded to the outside of the wall of casing 20 at a point immediately above the top of the tray deck assembly therein.

Figure 10:
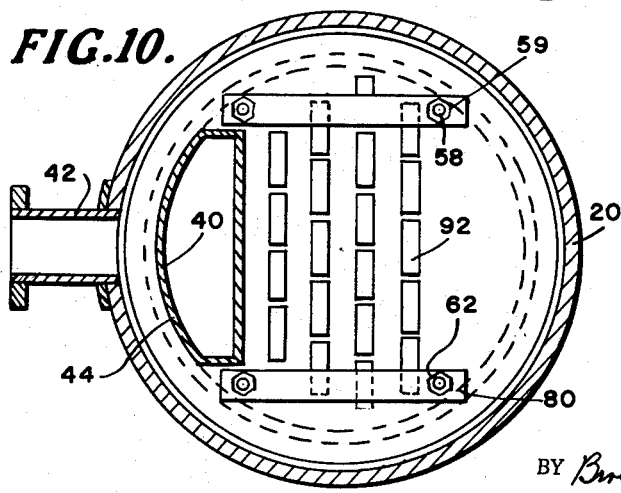
FIGURE 10 is a horizontal cross section view from beneath the base plates of the lower tray of an upper tray group with a partial view of the lower tray of the group (with reference to the view of FIGURE 8), taken along lines 10—10 of FIGURE 1.
Figure 11:
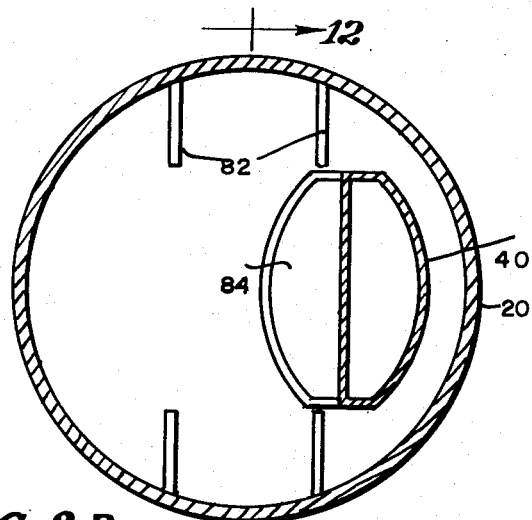
FIGURE 11 is a horizontal cross section view taken along lines 11—11 of FIGURE 1.
Figure 13:
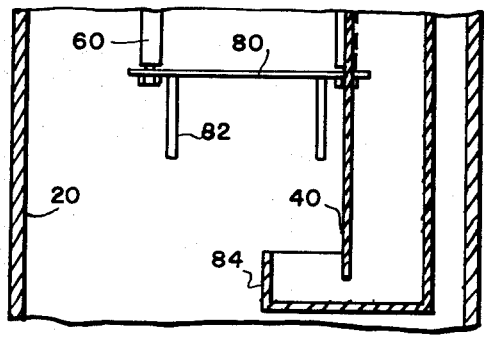
FIGURE 13 is a vertical cross section view taken along lines 13—13 of FIGURE 12.

Below the lowermost tray deck 36 of each tray deck group are provided base plates 80 a spaced distance below lowermost tray deck 36 (FIGURES 10 and 13). At intermediate divisions between each group of tray decks 36, these base plates 80 engage extension pieces 64 of the preceding group of tray decks inserted in casing 20 (FIGURE 1 and FIGURE 9), so that the upper group of tray decks securely come to rest by the engagement of their base plates 80 with extension pieces 64 of the preceding group of tray decks entering the casing 20. As seen in FIGURE 1, the distance between the lowermost tray deck 36 of the top group of tray decks and the uppermost tray deck 36 of the bottom group of tray decks is identical to that between succeeding tray decks within each group.

Figure 12:
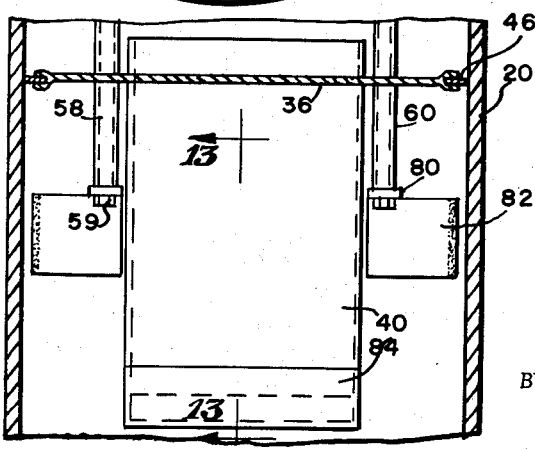
FIGURE 12 is a vertical cross section view taken along lines 12—12 of FIGURE 11.
Figure 14:
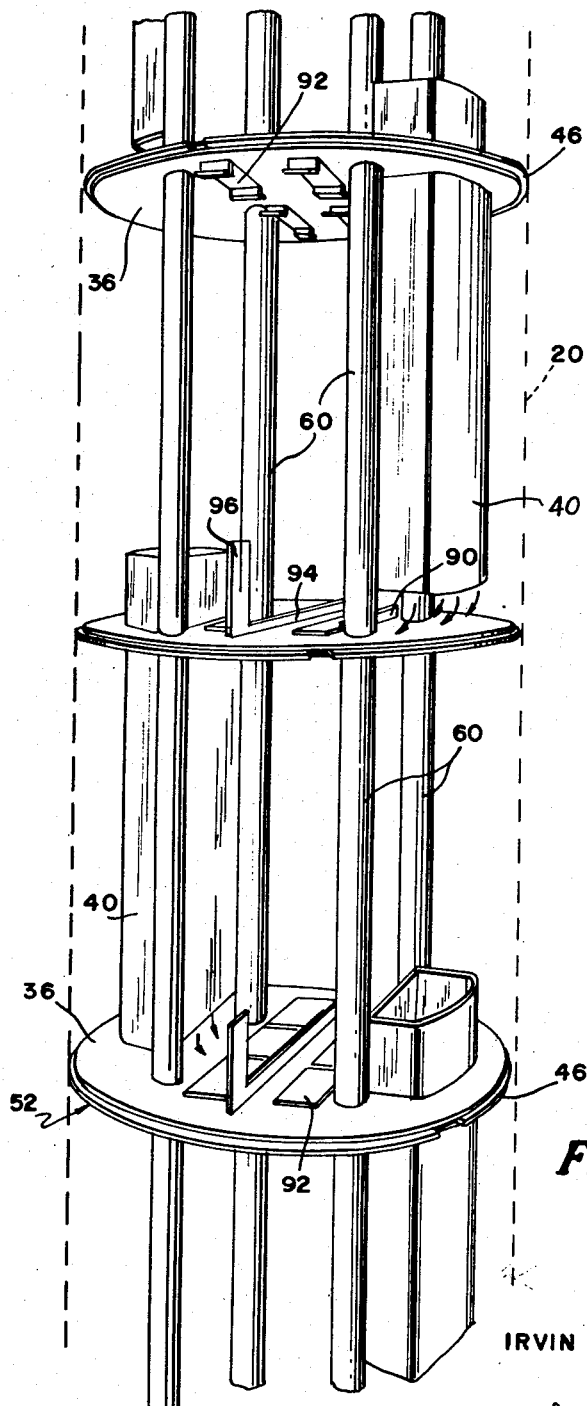
FIGURE 14 is a view in perspective showing a portion of a bubble tower similar to that illustrated in FIGURE 1 but employing only two rows of bubble valves and having the outer casing removed.

The lowermost tray deck of the lowermost group of tray decks of the assembly within the casing 20 is similarly equipped with base plates 80, spaced below bottom tray deck 36 by securement rods 58 and spacer tubes 60 (FIGURES 12 and 13). Support lugs 82 are permanently mounted to the inside wall of casing 20 as by welding, and engage base plates 80 below the lowermost tray deck 36 to support all of the above tray deck groups located within the casing 20. The downcomer 40 below the lowermost tray in the vessel is provided with a trap 84 (FIGURES 12 and 13) to form a liquid seal between the space in the bottom of the tower below the lowermost tray deck 36 and that just above the lowermost tray deck 36. This causes the vapor rising through tray deck 36 at the base of the casing 20 to pass through the apertures or openings provided for vapor passage in the tray instead of taking a course through the lowermost downcomer 40, which might tend to interfere with the downflow of liquid from this bottom tray deck of the system.

With the above description of integral parts of this invention, it can be seen that liquid enters through liquid inlet 32 and for certain processes may be supplemented with liquid entering through secondary liquid inlet 42, whereupon the liquid takes a sinuous course transversing each tray deck horizontally, thence into a downcomer, thence to the next tray deck below and so forth until it finally reaches the lowermost downcomer and thence flows into the lowest compartment of the casing 20 from which it is withdrawn through a liquid outlet 26 secured to outer wall of casing 20 below lowermost tray deck 36. Each tray deck 36 (FIGURE 4) is arranged such that downcomer 40, at upper point 86 over which the liquid flows leaving tray deck 36, extends a greater distance above the tray deck than downcomer 40 at lower point 88 whence liquid is delivered to the tray deck from the tray deck above. With this arrangement, the height of liquid above tray deck 36 submerges the lower point 88 of downcomer 40 supplying liquid to the tray. As a result, vapors above tray deck 36 must take their course upwardly through the apertures of the next tray deck 36 above and therefore, cannot enter the downcomer 40 delivering liquid to the tray deck from the tray deck above. Upon liquid entering the tray deck at lower point 88 (FIGURE 4), interrupter 90 prevents vapor escaping through floating valves 92 from jetting into downcomer 40, which would injuriously affect the process; at the same time it acts to prevent liquid emitting from downcomer 40 at lower point 88 from scooping the floating valves 92 open by the liquid velocity and keeping them open, which would tend to result in a short circuiting of the liquid flow across tray deck 36. The term floating valve in this context refers to valves of the type disclosed in the patent to Nutter, No. 2,951,691 or valves operative for an equivalent purpose. Vapor barrier 94 is located centrally of and extends across the tray deck so that light weight floating valves 92a may be made of lesser thickness material in the area next to the downcomer 40 from which liquid leaves the tray deck than the floating valves 92, on the side of the tray deck receiving the liquid. This permits the area containing floating valves 92a to come into full action to give the tray deck full performance at reduced loading conditions or at low pressure differential across tray deck 36 before floating valves 92 at increased loading conditions or increased pressure differential across tray deck 36, are also raised and come into operation. Liquid deflectors 96 (FIGURES 2 and 3) are mounted adjacent the edges of the tray deck to cause the liquid passing across tray deck 36 to take a course over the vapor contact openings to prevent the liquid from short circuiting or flowing around the ends of floating valves 92 and 92a.

Heretofore I have described the path of the liquid descending through the casing of the tower and I have further disclosed an improved apparatus to direct the ascending vapor for more efficiently contacting the liquid. The apparatus has been designed to be easily inserted and removed from the casing of the tower.

The mounting means for each group of tray decks 36 consisting of rods 58, spacer tubes 60, headers 62 and base plates 80 has been arranged in a planned geometric arrangement to permit ease of placement thereof within the casing 20 of tower 18. Note that the downcomer 40 (FIGURE 12) must be positioned within narrow limits between support lugs 82 in order to avoid interference therewith. The next higher group of tray decks 36 must then be positioned so that base plates 80 at the bottom end thereof come to rest directly upon extension pieces 64 mounted to the upper end of the lower group of tray decks 36. With the support lugs 82 therefore determining the positioning of the tray deck groups within the casing 20 of tower 18, it is then possible to specifically determine the proper location of liquid inlets 32 and 42, as well as vapor inlet 28.

It will thus be seen that there has been provided by this invention an apparatus in which the various objects hereinbefore set forth together with many practical advantages, have been successfully achieved. As various possible embodiments may be made to the mechanical features of the above invention, all without departing from the scope thereof, it is to be understood that all matters hereinbefore set forth are shown in the accompanying drawings and are to be interpreted as illustrative and not in a limiting sense.

I claim:

A pre-assembled tray unit adopted for installation in a fluid contact tower comprising: a plurality of contact trays having fluid apertures therein, each of said trays having a peripheral edge portion which defines a circumferentially extending annular recess, means for detachably supporting said trays in spaced superposed relation to form a separable but unitary assembly which includes tray supporting members extending transversely through each of said trays, spacing members carried by said supporting members to retain adjacent trays in spaced superposed relation, means for detachably securing said trays and said supporting members in assembled relation, and a radially expandable resilient ring mounted in said annular recess, said ring having a gap formed therein to accommodate radial movement thereof within said annular recess between a contracted condition during installation of the pre-assembled tray unit in such a tower and a radially expanded condition for laterally aligning and sealing the peripheral edge portion of each tray of the unitary assembly relative to said tower whereby said gap defines a fluid passageway extending between said peripheral edge portion and said tower.

References Cited in the file of this patent

UNITED STATES PATENTS

| | | |
|---|---|---|
| 927,190 | Thompson | July 6, 1909 |
| 1,276,690 | Pyzel | Aug. 20, 1918 |
| 1,770,658 | Kremser | July 15, 1930 |
| 2,120,256 | Mensing | June 14, 1938 |
| 2,309,838 | Fitch et al. | Feb. 2, 1943 |
| 2,349,918 | Starr | May 30, 1944 |
| 2,545,651 | Cummings | Mar. 20, 1951 |
| 2,627,397 | Hendrix | Feb. 3, 1953 |
| 2,658,737 | Nutter | Nov. 10, 1953 |
| 2,666,737 | Hurd | Jan. 19, 1954 |
| 2,784,953 | Ng | Mar. 12, 1957 |
| 2,812,827 | Worley et al. | Nov. 12, 1957 |
| 2,951,691 | Nutter | Sept. 6, 1960 |

FOREIGN PATENTS

| | | |
|---|---|---|
| 886,967 | France | July 26, 1943 |

OTHER REFERENCES

German printed application 1,066,992, Oct. 15, 1959.